United States Patent
Chen (10) Patent No.: US 12,194,790 B2
(45) Date of Patent: Jan. 14, 2025

(54) BLUETOOTH TIRE PRESSURE DETECTION DEVICE

(71) Applicant: Chih-Yi Chen, Taipei (TW)

(72) Inventor: Chih-Yi Chen, Taipei (TW)

(73) Assignee: SYSGRATION LTD.

( * ) Notice: Subject to any disclaimer, the term of this patent is extended or adjusted under 35 U.S.C. 154(b) by 70 days.

(21) Appl. No.: 17/983,409

(22) Filed: Nov. 9, 2022

(65) Prior Publication Data

US 2023/0072393 A1 Mar. 9, 2023

Related U.S. Application Data

(63) Continuation-in-part of application No. 16/882,758, filed on May 26, 2020, now abandoned.

(51) Int. Cl.
*B60C 23/04* (2006.01)

(52) U.S. Cl.
CPC .................. *B60C 23/0455* (2013.01)

(58) Field of Classification Search
None
See application file for complete search history.

(56) References Cited

U.S. PATENT DOCUMENTS

| | | | |
|---|---|---|---|
| 4,308,520 A * | 12/1981 | Darlington | B60C 23/0496 340/448 |
| 9,446,634 B2 * | 9/2016 | Wagner | B60C 23/0454 |
| 9,481,216 B2 * | 11/2016 | Chow | B60C 23/20 |
| 9,950,577 B1 * | 4/2018 | Marlett | B60C 23/0416 |
| 10,220,660 B2 * | 3/2019 | McIntyre | B60C 23/0471 |
| 10,875,365 B2 * | 12/2020 | Mouchet | B60C 23/0467 |
| 11,160,152 B2 * | 10/2021 | Shitara | B60Q 1/5037 |
| 11,279,183 B2 * | 3/2022 | Bout | B60C 23/0479 |
| 11,915,573 B1 * | 2/2024 | Campbell | G02C 11/10 |
| 2009/0224901 A1 * | 9/2009 | Yu | B60C 23/0479 340/447 |
| 2010/0207753 A1 * | 8/2010 | Sugiura | B60C 23/0433 340/447 |
| 2015/0283868 A1 * | 10/2015 | Chow | B60C 23/0462 340/447 |
| 2015/0367691 A1 * | 12/2015 | Liu | B60C 23/0479 340/447 |
| 2016/0039254 A1 * | 2/2016 | Wagner | B60C 23/02 340/442 |

(Continued)

FOREIGN PATENT DOCUMENTS

EP 2042350 A2 * 4/2009 ......... B60C 23/0408

*Primary Examiner* — Carlos Garcia (57) ABSTRACT

A tire pressure detection device includes a chip, a Bluetooth receiving circuit, a Bluetooth antenna, a battery, an LF trigger coil, a power switch, an LF trigger switch and a monitor respectively connected to a case. The Bluetooth receiving circuit is electrically connected to the chip and the Bluetooth antenna. The LF trigger coil, the power switch, the LF trigger switch and the monitor are respectively connected to the chip. A user holds and inserts the tire pressure detection through a double rims. The chip sends an LF signal via the LF trigger coil to activate a Bluetooth tire pressure detector at the inner rim to detect tire pressure. A pressure signal of an inner tire is sent to the chip via the Bluetooth antenna and the Bluetooth receiving circuit. The chip displays the tire pressure of the inner tire on the monitor to be checked by the user.

8 Claims, 11 Drawing Sheets

(56) References Cited

U.S. PATENT DOCUMENTS

| | | | |
|---|---|---|---|
| 2016/0225210 A1* | 8/2016 | Chou | G07C 9/20 |
| 2016/0303925 A1* | 10/2016 | Liu | B60C 23/0462 |
| 2017/0136834 A1* | 5/2017 | Chong | B60C 23/0433 |
| 2018/0022169 A1* | 1/2018 | Markert | B60C 23/009 |
| | | | 340/442 |
| 2018/0050569 A1* | 2/2018 | Heng | B60C 23/0408 |
| 2018/0194176 A1* | 7/2018 | Bout | B60C 23/0479 |
| 2018/0312020 A1* | 11/2018 | Saburi | B60C 23/0461 |
| 2018/0361803 A1* | 12/2018 | Saburi | B60C 23/0442 |
| 2019/0230615 A1* | 7/2019 | Werner | B60C 23/0408 |
| 2020/0062051 A1* | 2/2020 | Mouchet | B60C 23/0461 |
| 2020/0384814 A1* | 12/2020 | Chen | B60C 23/0461 |
| 2021/0279995 A1* | 9/2021 | Muca | G07F 9/023 |
| 2021/0402832 A1* | 12/2021 | Stalnaker | B60C 23/002 |

\* cited by examiner

BLUETOOTH TIRE PRESSURE DETECTION DEVICE

This is a Continuation-In-Part patent application of applicant's former patent application Ser. No. 16/882,758, filed on May 26, 2020.

BACKGROUND OF THE INVENTION

1. Fields of the Invention

2. Descriptions of Related Art

The conventional way to check tire pressure is to connect a tire pressure detector with the valve of the tire. However, this conventional tire pressure detector requires the user to connect the tire pressure detector with the tire valve one by one, and may spend a lot of time if multiple tires need to be checked.

Another conventional tire pressure detector uses wireless technology to obtain the information of the tire pressure. This tire pressure detector includes an emitter and a receiver, wherein the emitter is installed to the tire which detects the tire pressure of the tire, and the detected data of the tire pressure is sent to the receiver by a wireless method.

The detected data of the tire pressure is sent by Sub-1G wireless technology such as 433 MHz/315 MHz wireless signal band. However, the signals can easily be interfered. Therefore, this type tire pressure detectors are usually used to vehicles with two or four wheels. Trucks and trailers have more than eight wheels are not suitable for this type tire pressure detectors because the wheels are arranged side by side, so that the emitter of the adjacent tire may be wrongly activated when the user tries to check the other one. In some situations, the outer tire may have to removed, so as to receive the tire pressure signal of the inner tire.

The present invention intends to provide a tire pressure detection device using Bluetooth communication so as to eliminate the shortcomings mentioned above.

SUMMARY OF THE INVENTION

The present invention relates to a tire pressure detection device includes a chip, a Bluetooth receiving circuit, a Bluetooth antenna, a battery, an LF trigger coil, a power switch, an LF trigger switch and a monitor respectively connected to a case. The Bluetooth receiving circuit is electrically connected to the chip and the Bluetooth antenna. The LF trigger coil, the power switch, the LF trigger switch and the monitor are respectively connected to the chip.

When in use, a user holds the tire pressure detection device and inserts the tire pressure detection device through a double rims. The chip sends an LF signal via the LF trigger coil to activate a Bluetooth tire pressure detector at the inner rim to detect tire pressure. A pressure signal of an inner tire is sent to the chip via the Bluetooth antenna and the Bluetooth receiving circuit. The chip displays the tire pressure of the inner tire on the monitor so that the user can check the status of the tire. The tire pressure detection device is especially suitable for detecting tire pressure of heavy-duty vehicles such as trucks and trailers with double rims, without removing the outer tires or bending over to the bottom of the vehicle for inspection.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the tire pressure detection device 100 of the present invention comprises a case, and a chip 110, a Bluetooth receiving circuit 120, a Bluetooth antenna 130, a battery 140, an LF trigger coil 150, a power switch 160, an LF trigger switch 170 and a monitor 180 are respectively connected to the case. The Bluetooth receiving circuit 120 is electrically connected to the chip 110 and the Bluetooth antenna 130. The LF trigger coil 150, the power switch 160, the LF trigger switch 170 and the monitor 180 are respectively connected to the chip 110.

Figure 6:
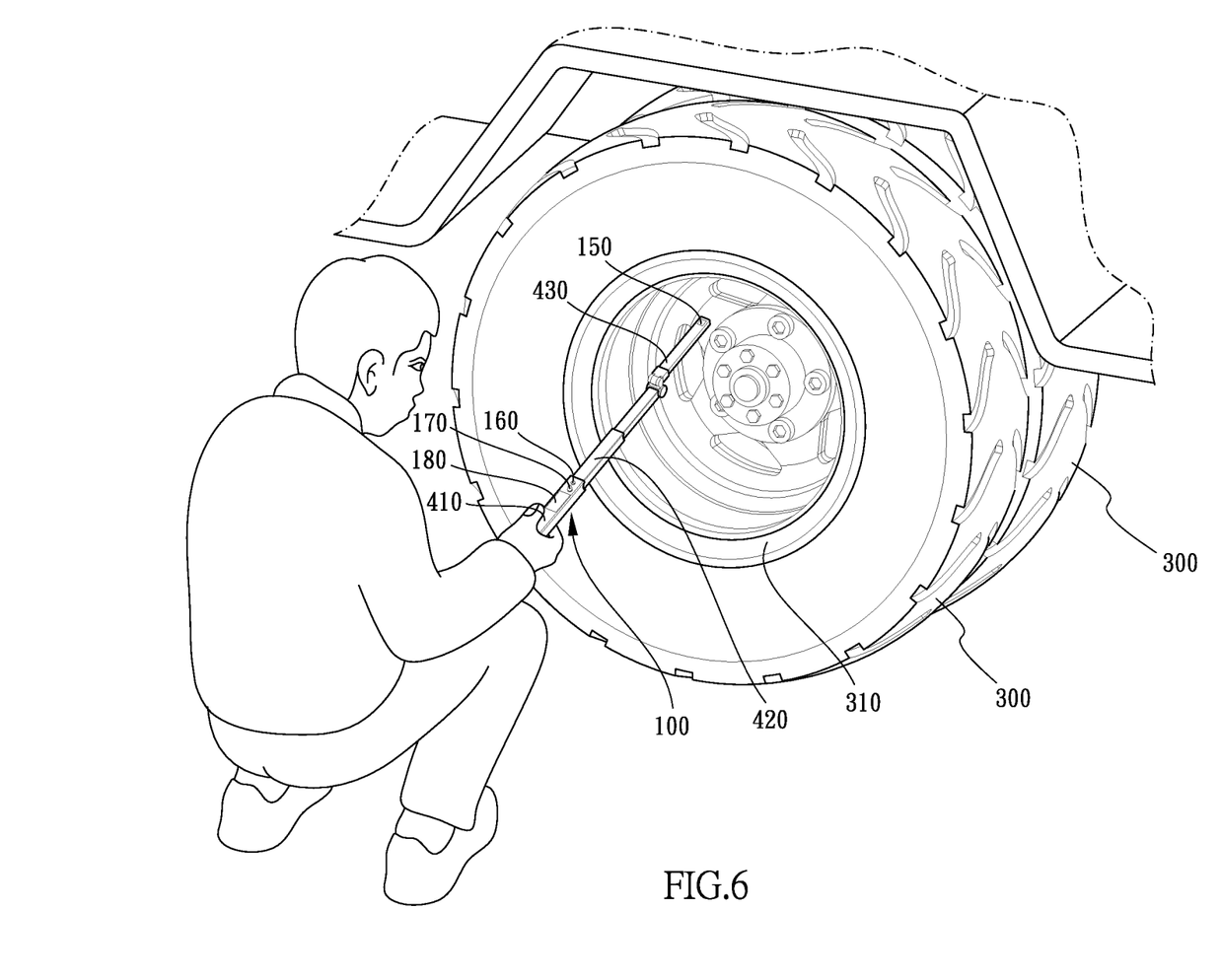
FIG. 6 shows that a user holds the tire pressure detection device of the present invention and ready to insert the tire pressure detection device through the double rims.
Figure 7:
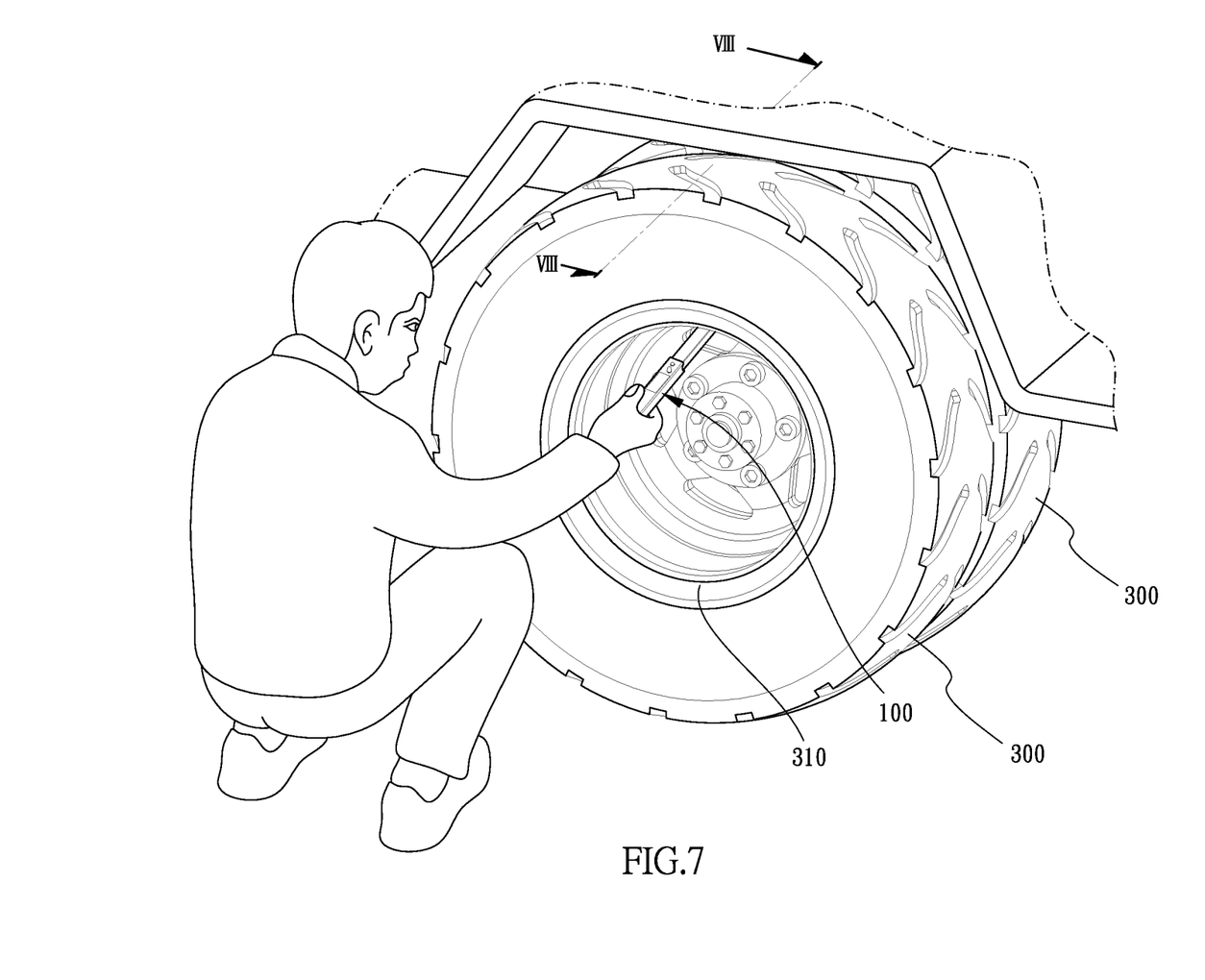
FIG. 7 shows that a user holds the tire pressure detection device of the present invention and inserts the tire pressure detection device through the double rims.
Figure 8:
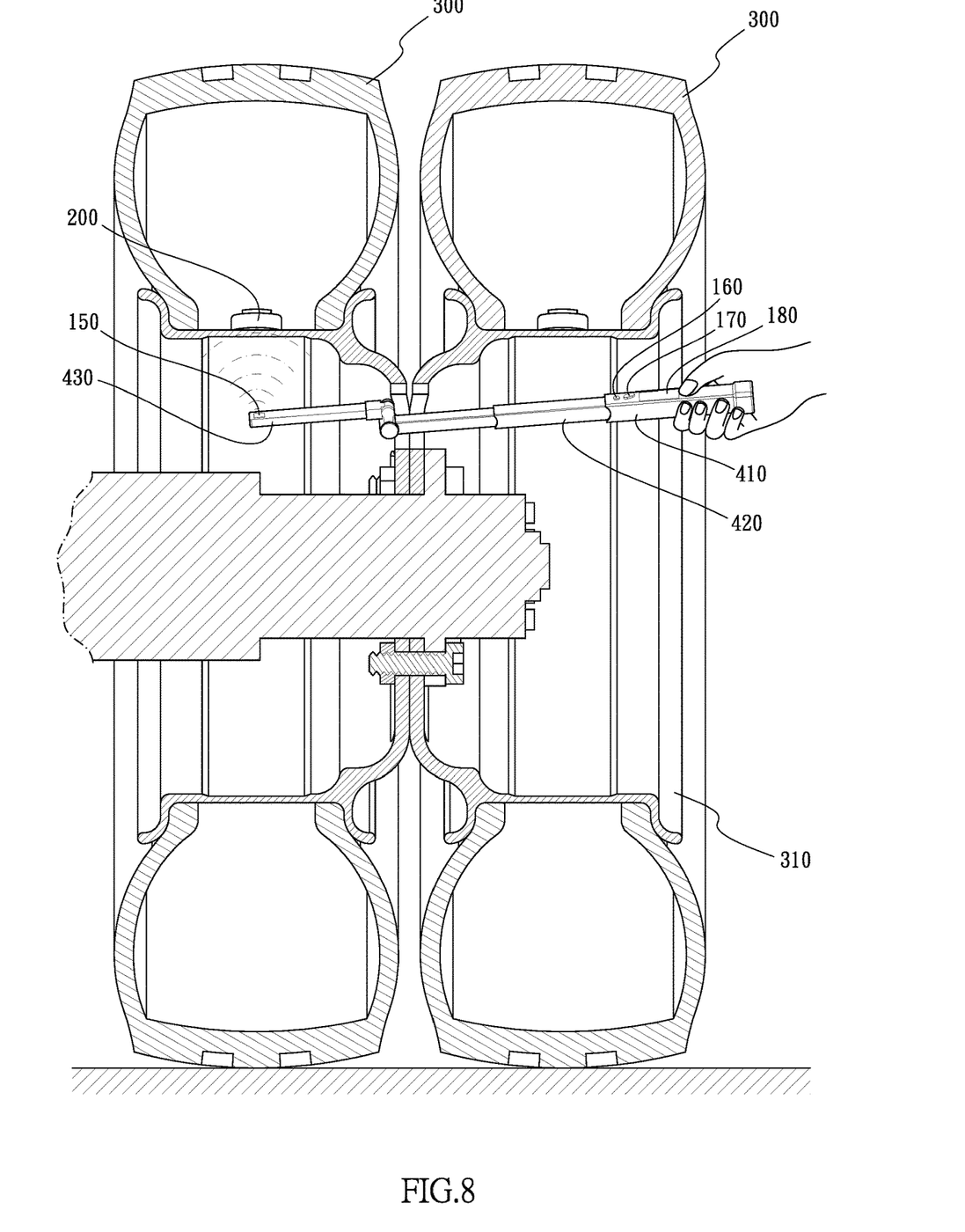
FIG. 8 is a cross sectional view taken along line VIII-VIII of FIG. 7.

As shown in FIGS. 6 to 8, the tire pressure detection device 100 uses LF signals to activate the Bluetooth tire pressure detector 200 so that the Bluetooth tire pressure detector 200 transmits the detected tire pressure signals by Bluetooth communication. The type and function of the Bluetooth tire pressure detector 200 can be installed inside the tire 300 or at the valve nozzle. The Bluetooth tire pressure detector 200 is installed inside the tire 300 in this embodiment. The Bluetooth tire pressure detector 200 can be used after it is paired to the tire pressure detection device 100.

There are more tires 300 for trucks and trailers and these tires 300 are heavy. In order to transport goods under heavy load, most of the trucks and trailers have double rims 310, and each double rim 310 has an inner tire and an outer tire. The Bluetooth tire pressure detectors 200 of these tires 300 are required not to be interfered with each other, so that each Bluetooth tire pressure detector 200 has an individual identification code. When the tire pressure detection device 100 is paired with the specific Bluetooth tire pressure detectors 200, by checking the identification code, the user is acknowledged that the Bluetooth tire pressure detectors 200 of the specific tire is paired with the tire pressure detection device 100 so as to precisely detect the tire pressure.

The chip 110 displays the tire pressure of the identification code and the tire pressure on the monitor 180 so that the user is acknowledged the tire pressure of the specific tire 300.

When the Bluetooth tire pressure detectors 200 is not in use, the power energy can be saved. Therefore the Bluetooth tire pressure detectors 200 needs to be activated in order to allow the user to check the tire pressure. The user holds the tire pressure detection device 100 and inserts the tire pressure detection device 100 through the double rims 310, and moves the LF trigger coil 150 to close to the Bluetooth tire pressure detector 200 at the inner tire 300 of the double rim 310 as shown the tire 300 at the left side of FIG. 8. The Bluetooth tire pressure detector 200 is then activated by the LF signal emitted from the LF trigger coil 150. A pressure signal detected from the inner tire 300 is sent to the chip 110 via the Bluetooth antenna 130 and the Bluetooth receiving circuit 120. The detected tire pressure is then displayed on the monitor 180 and is checked by the user. The tire pressure detection device 100 is especially suitable for detecting tire pressure of heavy-duty vehicles such as trucks and trailers with double rims 30. The user does not need to remove the outer tire or bend over to the bottom of the vehicle for inspection.

The case includes a grip 410, a first section 420 and a second section 430. The first section 420 has the first end thereof slidably connected to the grip 410, and the second end of the first section 420 is pivotably connected to the second section 430. When the first section 420 is retracted toward the axial direction of the grip 410, and the second section 430 is pivoted and faces the grip 410, the tire pressure detection device 100 is in a folded status. When the first section 420 is expanded toward a direction away from the axial direction of the grip 410, and the second section 430 is pivoted and does not faces the grip 410, the tire pressure detection device 100 is in an operational status. The pivotal angle of the second section 430 is up to 180 degrees.

When the tire pressure detection device 100 is in the folded status, it is compact and convenient for storage. When using the tire pressure detection device 100, the tire pressure detection device 100 can be expanded to be an elongate device to easily be inserted through the double rims 310 to precisely activate the Bluetooth tire pressure detector 200 that is located at the inner tire while the Bluetooth tire pressure detector 200 at the outer tire is not activated. The user's hand does not need to be inserted into and contact the double rims 310 to avoid from being injured during operation.

The so called inner tire is located at the inner side of the double rims 310.

Figure 4:
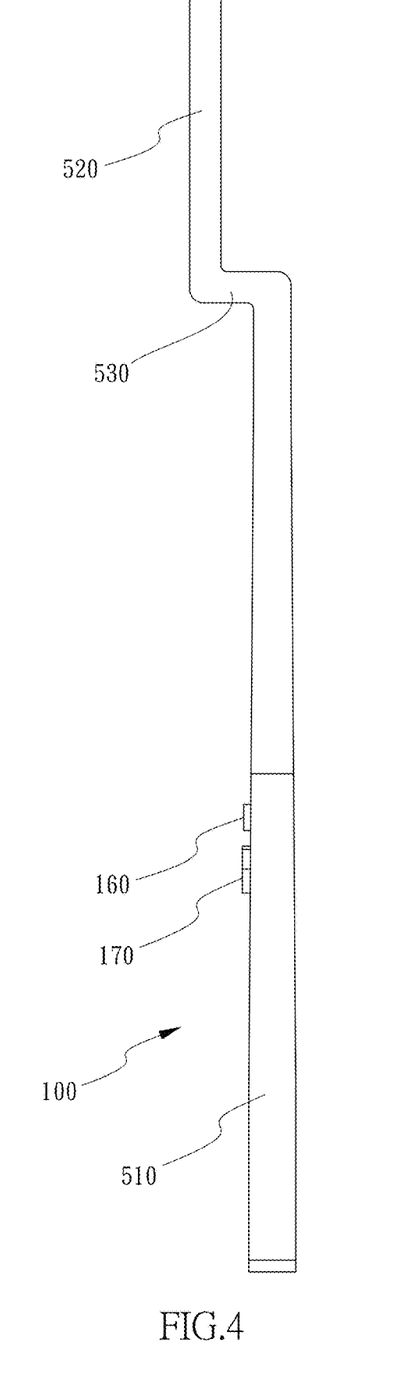
FIG. 4 is a perspective view to show that the tire pressure detection device of the present invention is expanded to its operational status.
Figure 5:
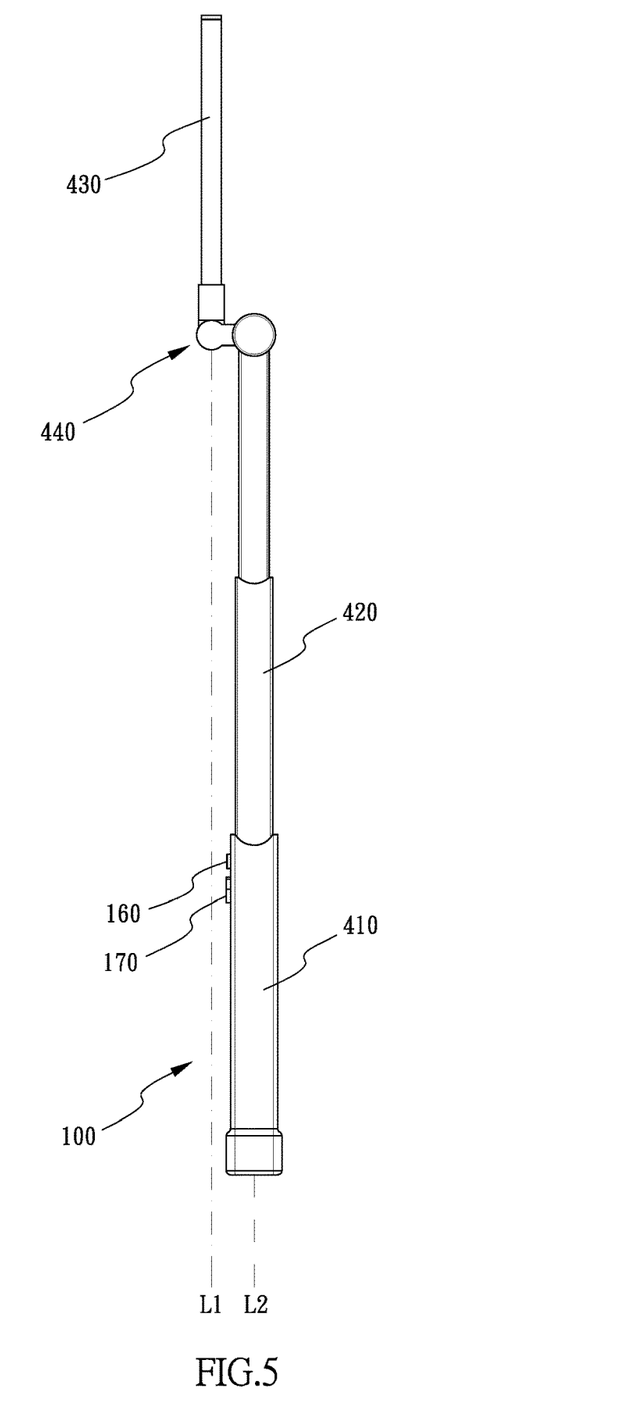
FIG. 5 is a side view to show the tire pressure detection device of the present invention in its operational status.

As shown in FIGS. 4 and 5, a first imaginary line L1 is formed along the axial direction of the second section 430, and a second imaginary line L2 is formed along the axial direction of the grip 410, wherein the first imaginary line L1 is parallel to the second imaginary line L2. The grip 410 and the second section 430 are parallel to each other in either folded status or in operational status so that the grip 410 and the second section 430 are not interfered to each other, the second section 430 does not contact the grip 410 side by side in the folded status.

Figure 2:
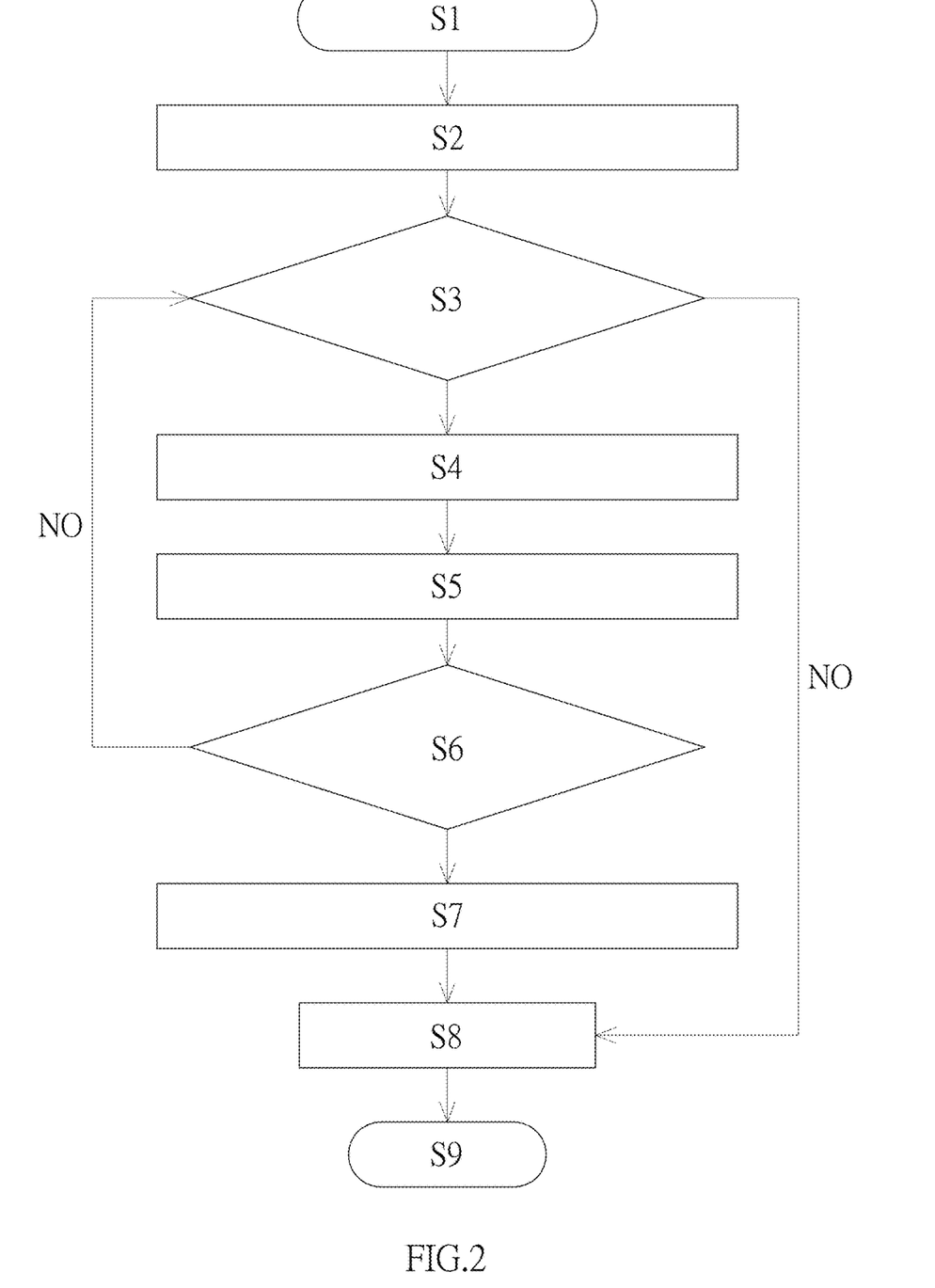
FIG. 2 is a perspective view of the tire pressure detection device of the present invention.
Figure 3:
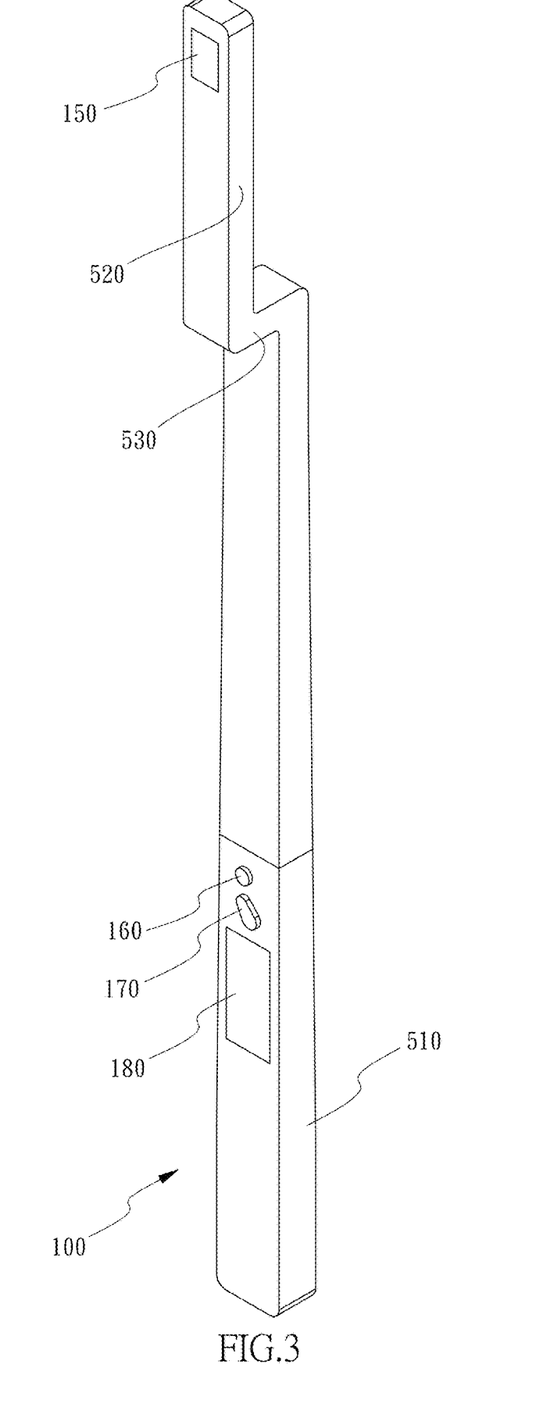
FIG. 3 is a side view of the tire pressure detection device of the present invention.

The LF trigger switch 170 includes a toggle switch, and the power switch 160 is a push-button switch which is located at a distance from the LF trigger switch 170.

In addition, the first section 420 includes multiple sub-sections which are retractable with each other. In this embodiment, there are two sub-sections of the first section 420. The first section 420 and the second section 430 are pivotably connected to each other by a pivot 440, so that the second section 430 is manipulated and pivotable relative to the grip 410.

Figure 1:
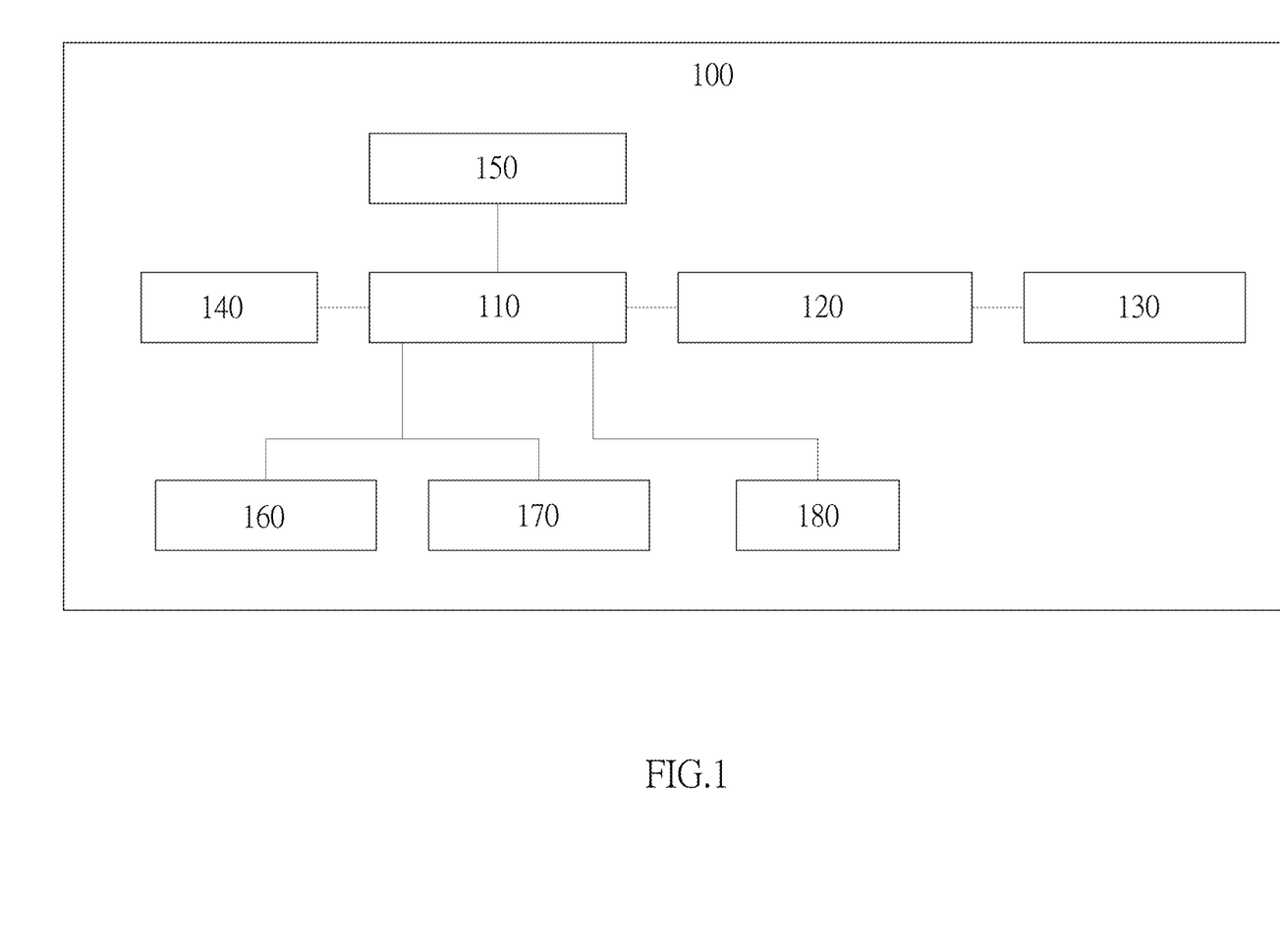
FIG. 1 shows the components of the tire pressure detection device of the present invention.

The battery 140 and the chip 110 are located in the grip 410. The power switch 160 and the monitor 180 are located on one of multiple sides of the grip 410. The Bluetooth receiving circuit 120 and the Bluetooth antenna 130 are located in the grip 410. The LF trigger coil 150 is connected to the second section 430 and does not protrude beyond the outside of the second section 430. The LF trigger switch 170 is connected to one of the multiple sides of the grip 410.

The LF trigger coil 150 does not protrude beyond the outside of the second section 430, and is protected by the second section 430, so that the LF trigger coil 150 is not hit by the double rims 310 when being inserted through the double rims 310.

When the tire pressure detection device 100 is folded, the second section 430 covers up the power switch 160 and the LF trigger switch 170 to avoid from being touched unintentionally. The monitor 180 is also protected from being scratched.

Figure 9:
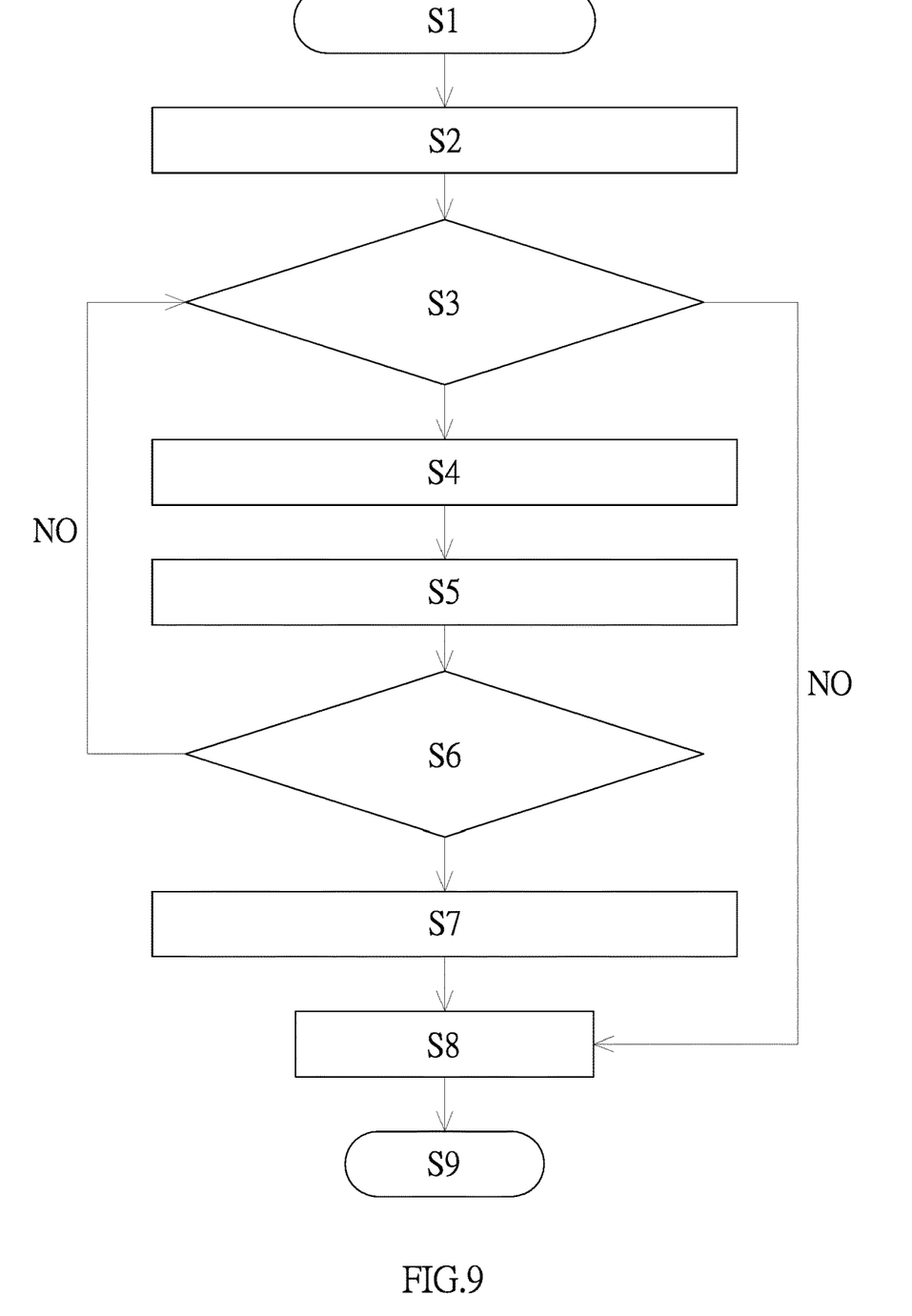
FIG. 9 shows the steps of the method for operating the tire pressure detection device of the present invention.

As shown in FIG. 9 which shows the steps of the method for operating the tire pressure detection device 100 of the present invention, and the steps comprises:

- a step S1: holding the tire pressure detection device 100 and turning on the power switch 160;
- a step S2: inserting one end of the tire pressure detection device 100 through the double rims 310 and facing the LF trigger coil 150 toward an inner tire;
- a step S3: the power switch being turned off when the LF trigger switch 170 is not operated for 10 minutes;
- a step S4: pressing the LF trigger switch 170 to activate the LF trigger tool 150;
- a step S5: the chip 110 sending an LF signal via the LF trigger coil 150 to activate a Bluetooth tire pressure detector 200 located at the inner tire to detect a tire pressure of the inner tire, and a tire pressure signal of the inner tire being sent to the tire pressure detection device 100 via the Bluetooth antenna 130 and the Bluetooth receiving circuit 120;
- a step S6: the chip 110 checking receipt of the tire pressure signal of the inner tire, when no tire pressure signal of the inner tire is received, repeat the step S3, when the tire pressure signal of the inner tire is received, the tire pressure signal of the inner tire is processed;
- a step S7: the chip 110 displaying the tire pressure of the inner tire and an identification code on the monitor 180, the tire pressure detection device 100 being removed from the double rims 310;
- a step S8: operating the power switch 160, and
- a step S9: completing operation of the tire pressure detection device 100 and turning off the power switch 160.

Figure 10:
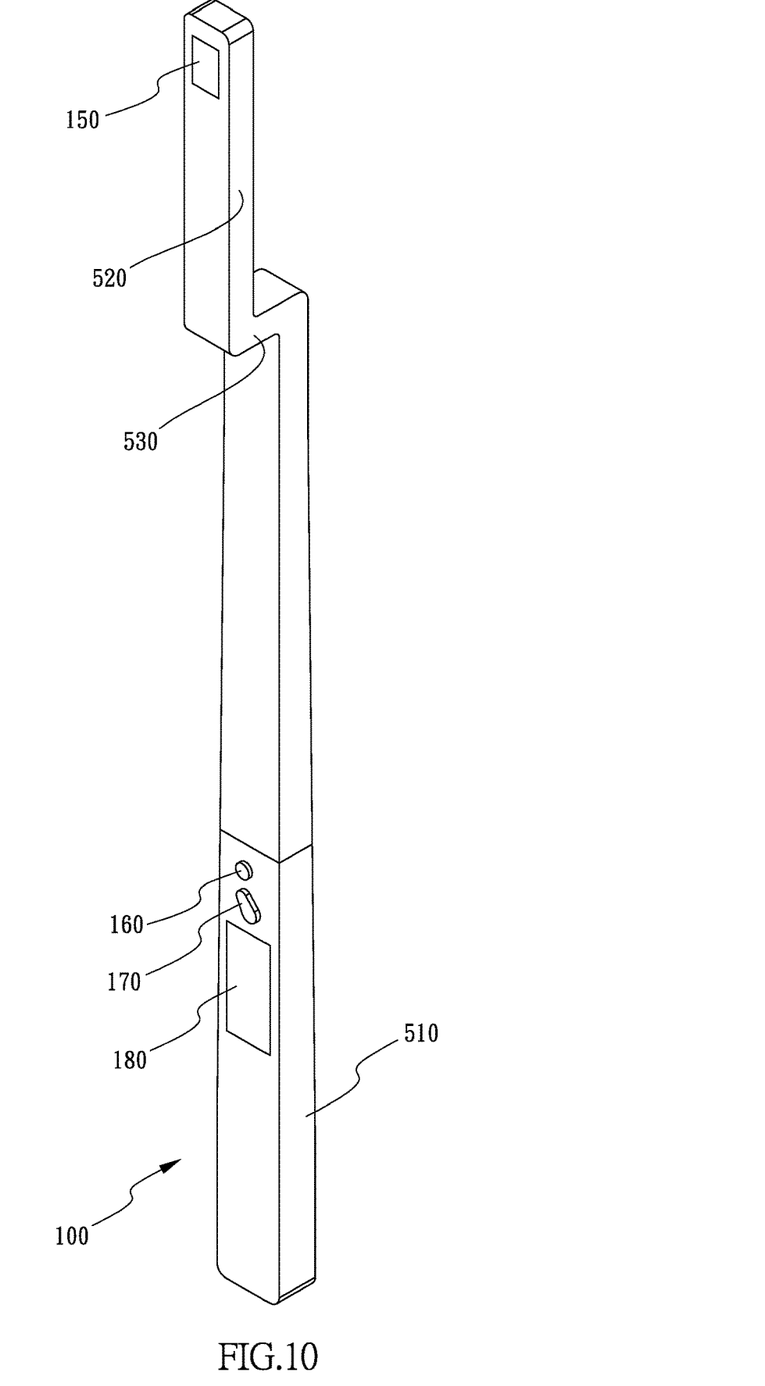
FIG. 10 is a perspective view of the second embodiment of the tire pressure detection device of the present invention.
Figure 11:
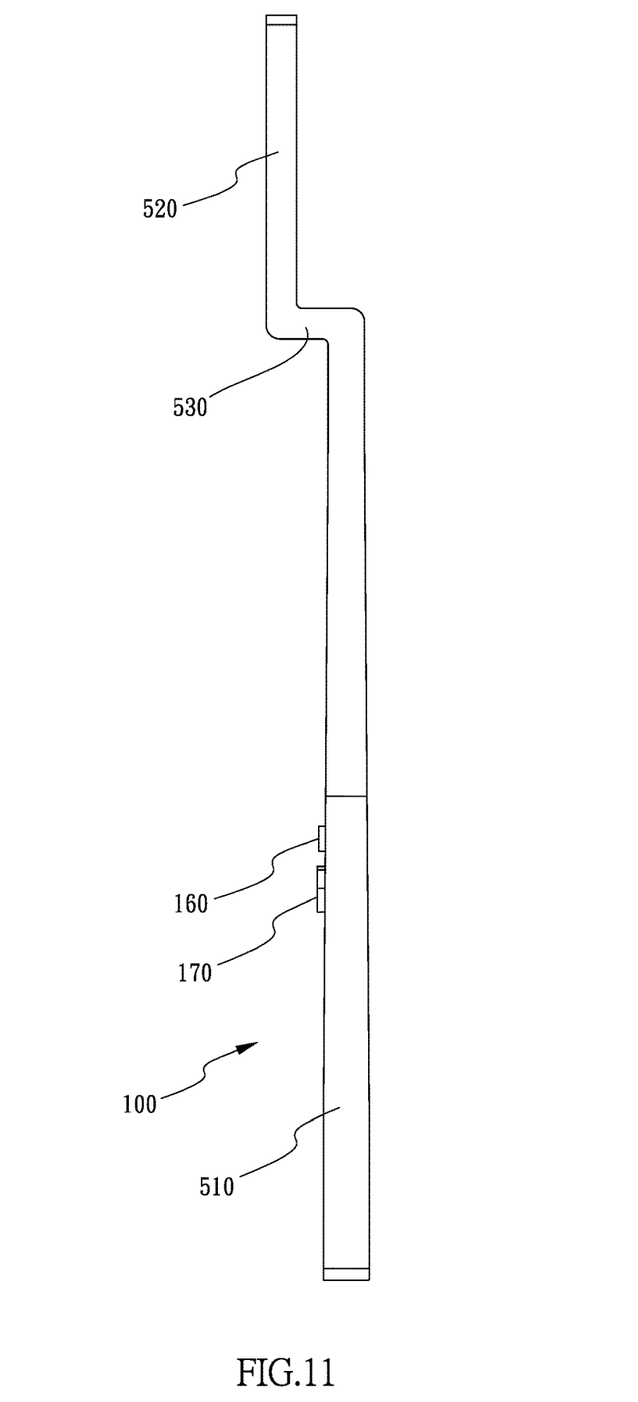
FIG. 11 shows the side view of the second embodiment of the tire pressure detection device of the present invention.

FIGS. 10 and 11 show the second embodiment of the tire pressure detection device 100 wherein the difference between the first and second embodiments is that the case of the second embodiment cannot be expanded and length adjusted. The case of the second embodiment is a single and integral case, and includes a grip 510, an extension section 520 and an operation section 530. The operation section 530 is integrally formed with the grip 510 and the extension section 520. The grip 510 and the extension 520 respectively extend toward two opposite directions.

While we have shown and described the embodiment in accordance with the present invention, it should be clear to those skilled in the art that further embodiments may be made without departing from the scope of the present invention.

What is claimed is:

1. A tire pressure detection device comprising:
   a case;
   a chip, a Bluetooth receiving circuit, a Bluetooth antenna, a battery, an low frequency trigger coil, a power switch, an low frequency trigger switch and a monitor respectively connected to the case, wherein the Bluetooth receiving circuit is electrically connected to the chip and the Bluetooth antenna, the low frequency trigger coil, the power switch, the low frequency trigger switch and the monitor are respectively connected to the chip, and
   the case including a grip, a first section and a second section, the first section having a first end thereof slidably connected to the grip, a second end of the first section pivotably connected to the second section.

2. The tire pressure detection device as claimed in claim 1, wherein the battery and the chip are located in the grip, the power switch and the monitor are located on one of multiple sides of the grip.

3. The tire pressure detection device as claimed in claim 1, wherein the Bluetooth receiving circuit and the Bluetooth antenna are located in the grip.

4. The tire pressure detection device as claimed in claim 1, wherein the low frequency trigger coil is connected to the second section and does not protrude beyond an outside of the second section, the low frequency trigger switch is connected to one of the multiple sides of the grip.

5. The tire pressure detection device as claimed in claim 1, wherein when the first section is retracted toward an axial direction of the grip, and the second section is pivoted and faces the grip, the tire pressure detection device is in a folded status, when the first section is expanded toward a direction away from the axial direction of the grip, and the second section is pivoted and does not faces the grip, the tire pressure detection device is in an operational status.

6. The tire pressure detection device as claimed in claim 5, wherein a first imaginary line is formed along an axial direction of the second section, a second imaginary line is formed along the axial direction of the grip, the first imaginary line is parallel to the second imaginary line.

7. The tire pressure detection device as claimed in claim 1, wherein the case includes a grip, an extension section and an operation section, the operation section is integrally formed with the grip and the extension section.

8. The tire pressure detection device as claimed in claim 7, wherein the grip and the extension respectively extend toward two opposite directions.

* * * * *